United States Patent
Suzuki et al.

(10) Patent No.: US 6,681,582 B2
(45) Date of Patent: Jan. 27, 2004

(54) VAPOR COMPRESSION TYPE REFRIGERATION APPARATUS INCLUDING LEAK DETECTION AND METHOD FOR DETECTING REFRIGERANT LEAKS

(75) Inventors: Takahisa Suzuki, Kariya (JP); Tatsuo Tsunooka, Kariya (JP); Toshihiro Tahara, Nagoya (JP); Tetsuji Nobuta, Kariya (JP)

(73) Assignee: Denso Corporation, Kariya (JP)

( * ) Notice: Subject to any disclaimer, the term of this patent is extended or adjusted under 35 U.S.C. 154(b) by 74 days.

(21) Appl. No.: 10/114,217

(22) Filed: Apr. 2, 2002

(65) Prior Publication Data

US 2002/0139128 A1 Oct. 3, 2002

(30) Foreign Application Priority Data

Apr. 3, 2001 (JP) .................... 2001-105159
Jan. 10, 2002 (JP) .................... 2002-03550

(51) Int. Cl.[7] .................. F25B 45/00; G01K 13/00
(52) U.S. Cl. .......................... 62/129; 62/149
(58) Field of Search .................. 62/125, 129, 149, 62/176.3, 176.4, 178, 181, 190, 228.5, 228.3; 236/94

(56) References Cited

U.S. PATENT DOCUMENTS

| | | | | |
|---|---|---|---|---|
| 4,644,755 A | * | 2/1987 | Esslinger et al. | 62/126 |
| 4,829,777 A | * | 5/1989 | Matsuoka et al. | 62/212 |
| 4,862,698 A | * | 9/1989 | Morgan et al. | 62/177 |
| 5,275,009 A | * | 1/1994 | Kobayashi et al. | 62/129 |

FOREIGN PATENT DOCUMENTS

| | | |
|---|---|---|
| EP | 1074800 | 2/2001 |
| JP | 7-096737 | 4/1995 |

* cited by examiner

*Primary Examiner*—Melvin Jones
(74) *Attorney, Agent, or Firm*—Harness, Dickey & Pierce, PLC (57) ABSTRACT

A vapor compression type refrigeration apparatus is provided, in which refrigerant leakage is detected at an early stage. A temperature difference related to the theoretical heat dissipation of the condenser is compared with the actual temperature difference in heat dissipation (temperature difference between the condensation temperature and the outside-air temperature) of the condenser to determine whether there is a refrigerant leak.

24 Claims, 6 Drawing Sheets

VAPOR COMPRESSION TYPE REFRIGERATION APPARATUS INCLUDING LEAK DETECTION AND METHOD FOR DETECTING REFRIGERANT LEAKS

CROSS REFERENCES TO RELATED APPLICATIONS

This application relates to and incorporates by reference Japanese Patent application No. 2002-3550, filed on Jan. 10, 2002 and Japanese application No. 2001-105159, filed on Apr. 3, 2001.

BACKGROUND OF THE INVENTION

This invention relates to a vapor compression type refrigeration apparatus that has means for estimating the amount of refrigerant remaining in the cycle. This invention is effective for use in vehicle air-conditioning systems.

In a typical refrigeration apparatus used in a vehicle air-conditioning system, lubricating oil is mixed in the refrigerant, and the lubricating oil is circulated together with the refrigerant for lubrication of the movable and sliding members in the compressor.

However, if refrigerant leaks from a rubber hose, pipe joint or other location, and the amount of refrigerant remaining in the circuit decreases, the amount of refrigerant drawn into the compressor also decreases. Since the amount of lubricating oil supplied to the compressor decreases, serious damage such as seizure may occur in the compressor.

Conventionally, the pressure in the refrigeration circuit is detected. If the detected pressure is lower than a predetermined value (for example, 0.3 MPa), the amount of refrigerant remaining in the cycle is regarded as having decreased below the predetermined level, and the operation of the compressor is suspended.

Even when there is a refrigerant leak, the pressure inside the refrigeration system does not fall as long as the liquid refrigerant exists in the system because the refrigeration cycle occurs in a closed system. That is, the liquid refrigerant evaporates in the gas-liquid separator to maintain the saturation pressure.

The pressure on the lower pressure side of the refrigeration system does not start decreasing unless the refrigerant leak continues even after all the liquid refrigerant in the refrigeration system has evaporated. Thus, when the pressure on the lower pressure side becomes lower than a predetermined value, the amount (weight) of refrigerant remaining in the system has already become significantly lower than normal.

As a result, according to the conventional method of monitoring pressure in the refrigeration system, damage to the compressor may occur because a refrigerant leak, if one occurs, cannot be detected until the amount of refrigerant remaining in the system has significantly decreased from the normal level.

Particularly, when the refrigerant leaks little by little (a so-called slow leak), there is a fear that the compressor will be seriously damaged if the amount of remaining refrigerant becomes approximately 50% or less than the normal level. Thus the leak must be detected before the amount of remaining refrigerant has become 50% or less than the normal level. However, according to the conventional method of monitoring the pressure in the refrigeration circuit, it is very difficult to detect a refrigerant leak before the amount of remaining refrigerant has become about 10% or less than the normal level.

SUMMARY OF THE INVENTION

This invention has been made to solve these problems, and its object is to detect refrigerant leaks at an early stage.

Basically, according to a first aspect, the invention is a vapor compression type refrigeration apparatus that includes a compressor (21), a condenser (22), a decompressor (24) and an evaporator (25). The apparatus, cools a high-temperature, high-pressure refrigerant compressed with the compressor (21) with the condenser (22) and evaporates low-temperature, low-pressure refrigerant decompressed with the decompressor (24). An amount of refrigerant remaining in the refrigeration circuit is determined by comparing an actual parameter ($\Delta T$) related to actual heat dissipation (Q) in the condenser (22) and a theoretical parameter ($i\Delta T$) related to heat dissipation (iQ) in the condenser (22).

Since the difference between the theoretical heat dissipation (iQ) in the condenser (22) and the actual heat dissipation (Q) in the condenser (22) becomes large as explained later, a decrease in refrigerant can be precisely detected, even when the amount of refrigerant has only slightly decreased from the normal level in the refrigeration circuit. Refrigerant leakage can thus be detected relatively early.

If refrigerant leakage is detected based on the heat dissipation on the condenser (22) side, it is not necessary to consider the generation of condensed water, or latent heat, as explained later. Thus, the parameters related to the heat dissipation on the condenser (22) side can be calculated with accuracy.

A vapor compression type refrigeration apparatus according to a second aspect of the present invention includes a compressor (21), a condenser (22), a decompressor (24) and an evaporator (25). The apparatus, cools a high-temperature, high-pressure refrigerant compressed with the compressor (21) with the condenser (22) and evaporates low-temperature, low-pressure refrigerant decompressed with the decompressor (24). The apparatus further includes actual heat dissipation parameter calculation means (18c, 18d) for calculating a parameter ($\Delta T$) related to actual heat dissipation (Q), theoretical heat dissipation parameter calculation means (S150) for calculating a theoretical parameter ($i\Delta T$) related to heat dissipation (iQ) in the condenser (22) based on data provided when a normal level of refrigerant exists in the refrigeration circuit, and remaining refrigerant amount determination means (S160) for determining an amount of refrigerant remaining in the refrigeration circuit by comparing the parameter ($\Delta T$) calculated by the actual heat dissipation parameter calculation means (18c, 18d) and the parameter ($i\Delta T$) calculated by the theoretical heat dissipation parameter calculation means (S150).

Since the difference between the theoretical heat dissipation (iQ) in the condenser (22) and the actual heat dissipation (Q) in the condenser (22) becomes large as explained later, a decrease in refrigerant can be precisely detected, even when the amount of refrigerant has only slightly decreased from the normal level in the refrigeration circuit. Refrigerant leakage can thus be detected early.

If refrigerant leakage is detected based on the heat dissipation on the condenser (22) side, there is no need to consider the generation of condensed water, or latent heat, as explained later. Thus the parameters related to the heat dissipation on the condenser (22) side can be calculated accurately.

A vapor compression type refrigeration apparatus according to a third aspect of the present invention includes a compressor (21), a condenser (22), a decompressor (24) and an evaporator (25). The apparatus, cools a high-temperature, high-pressure refrigerant compressed with the compressor (21) with the condenser (22) and evaporates low-temperature, low-pressure refrigerant decompressed with the decompressor (24). The apparatus further includes actual heat dissipation parameter calculation means (18c, 18d) for calculating a parameter ($\Delta T$) related to actual heat dissipation (Q), theoretical heat dissipation parameter calculation means (S150) for calculating a theoretical parameter (i$\Delta T$) related to heat dissipation in the condenser (22) based on a physical quantity (Te), which is related to an evaporation temperature of refrigerant in the evaporator (25) when a normal level of refrigerant exists in the refrigeration circuit, and remaining refrigerant amount determination means (S160) for determining an amount of refrigerant remaining in the refrigeration circuit by comparing the parameter ($\Delta T$) calculated by the actual heat dissipation parameter calculation means (18c, 18d) and the parameter (i$\Delta T$) calculated by the theoretical heat dissipation parameter calculation means (S150).

In this way, since the difference between the theoretical heat dissipation (iQ) in the condenser (22) and the actual heat dissipation (Q) in the condenser (22) becomes large as explained below, a decrease in refrigerant can be precisely detected, even when the amount of refrigerant has only slightly decreased from the normal level. Refrigerant leakage is thus detected early.

If refrigerant leakage is detected based on the heat dissipation on the condenser (22) side, there is no need to consider the generation of condensed water, or latent heat, as explained later. Thus the parameters related to the heat dissipation on the condenser (22) side can be calculated accurately.

It is preferred to use the difference between a temperature related to the refrigerant temperature inside the condenser (22) and the temperature of cooling air sent to the condenser (22) for the actual parameter ($\Delta T$) and theoretical parameter (i$\Delta T$).

The temperature difference of cooling air across the condenser (22) may be used as the actual parameter ($\Delta T$) and theoretical parameter (i$\Delta T$).

As described later, if there is an insufficient amount of refrigerant, the suction pressure of the compressor (21) changes significantly. Thus, refrigerant leakage can be more precisely detected by taking the suction pressure of the compressor (21) into account in the calculation of the theoretical parameter (i$\Delta T$).

Also as described later, if there is an insufficient amount of refrigerant, a specific enthalpy change (i$\Delta H$) of refrigerant in the condenser (22) changes significantly. Thus, refrigerant leakage can be more precisely detected by taking the specific enthalpy change (i$\Delta H$) of refrigerant in the condenser (22) into account in the calculation of the theoretical parameter (i$\Delta T$).

Furthermore, the theoretical parameter (i$\Delta T$) may be calculated based on the suction pressure of the compressor (21) and also may be based on a specific enthalpy change (i$\Delta H$) of refrigerant in the condenser (22). Refrigerant leakage can thus be detected more precisely.

A vapor compression type refrigeration apparatus according to a fourth aspect of the present invention includes a compressor (21), a condenser (22), a decompressor (24) and an evaporator (25). The apparatus, cools a high-temperature, high-pressure refrigerant compressed with the compressor (21) with the condenser (22) and evaporates low-temperature, low-pressure refrigerant decompressed with the decompressor (24). An amount of refrigerant remaining in the refrigeration circuit is determined by comparing an actual parameter related to actual heat absorption in the evaporator (25) and a theoretical parameter related to heat absorption in the evaporator (25).

Since the difference between the theoretical heat absorption and the actual heat absorption becomes large, a decrease in refrigerant can be precisely detected, even when the amount of refrigerant has only slightly decreased from the normal level in the refrigeration circuit. Refrigerant leakage can thus be detected at an early stage.

The compressor (21) may be a variable-capacity type compressor that controls the displacement such that the discharging rate becomes equal to a predetermined value, or a variable-capacity type compressor that varies the displacement based on the pressure difference across a throttle in the refrigerant circuit.

If a variable displacement compressor is used, it is preferred to calculate the theoretical parameter (i$\Delta T$) based on the smaller of a refrigerant flow rate calculated based on 100% compressor capacity and a maximum flow rate determined at least based on the discharge pressure of the compressor (21).

The reference numbers above are exemplary and correspond to the specific parts described in the illustrated embodiments described below.

DETAILED DESCRIPTION OF THE PREFERRED EMBODIMENTS

First Embodiment

Figure 1:
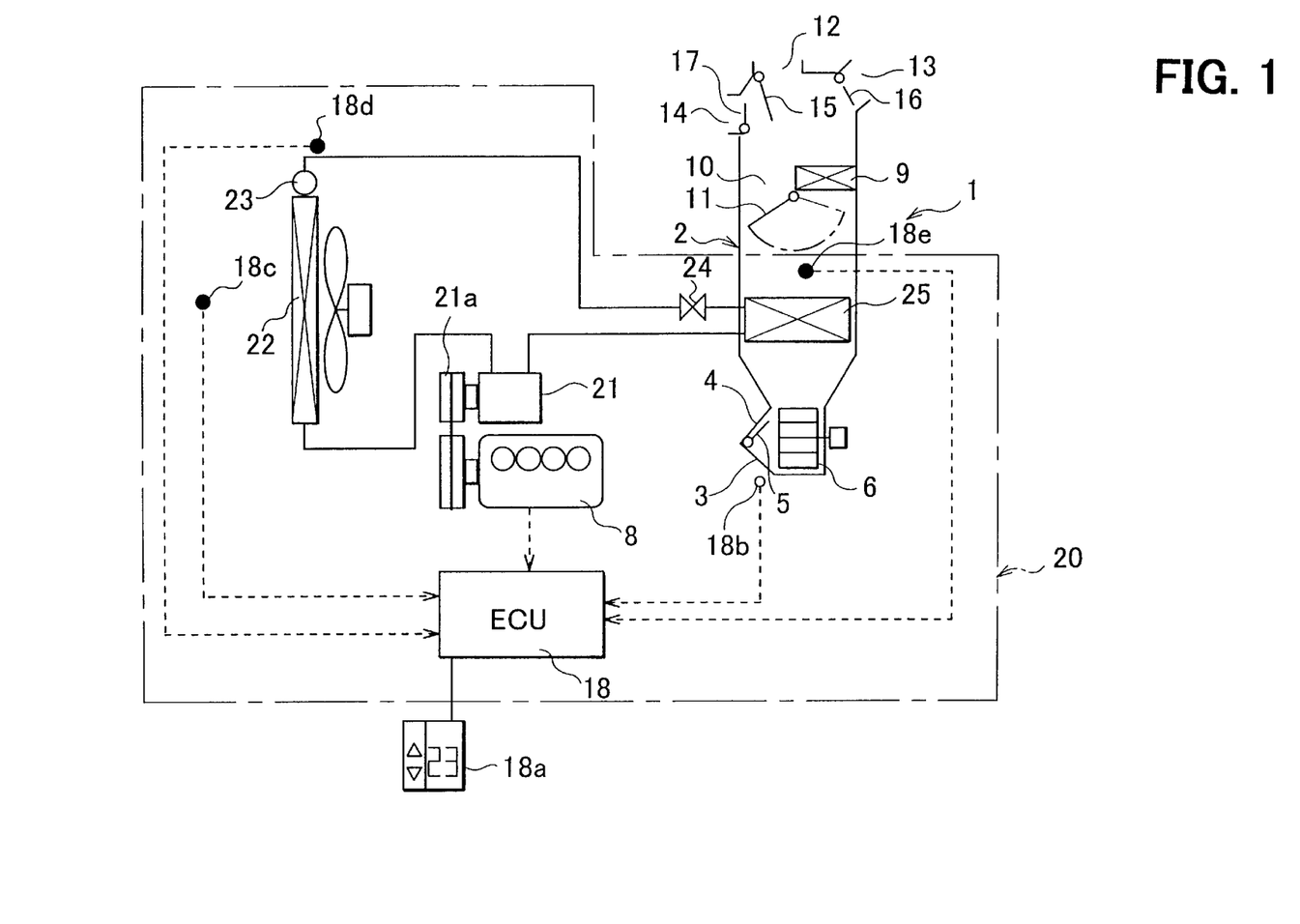
FIG. 1 is a schematic diagram of a vehicle air-conditioning system according to a first embodiment of the present invention.

In this embodiment, the vapor compression type refrigeration apparatus according to the present invention is used in a vehicle air-conditioning system. FIG. 1 is a schematic diagram illustrating the vehicle air-conditioning system 1 according to the present embodiment.

The vehicle air-conditioning system 1 according to the present embodiment has a passenger compartment air inlet 3, for taking in air from the passenger compartment, and an outside air inlet 4, for taking in outside air, and both are located in an air duct 2 that forms an air circuit. Also, an inlet switching door 5 that changes the opening ratio between the inlets 3, 4 is located in the duct 2.

A centrifugal blower 6 is installed downstream of the inlet switching door 5, and an evaporator 25 is installed downstream of the blower 6 to cool air that will be sent to the passenger compartment. All the air discharged from the blower 6 passes through the evaporator 25.

The evaporator 25 is a heat exchanger installed on the low pressure side of a vapor compression type refrigeration circuit 20 (hereafter, refrigeration circuit) that performs refrigeration by evaporating refrigerant. The refrigeration circuit 20 (the region surrounded with the broken line in FIG. 1) will be explained later.

A heater core 9 is located downstream of the evaporator 25. The heater core 9 uses cooling water for the engine 8 as a heat source to heat air that will be blown into the passenger compartment. In the air-conditioner duct 2 a bypass path 10 is formed for bypassing the heater core 9. An air-mix door 11 is located upstream of the heater core 9 to control the mixing ratio of warm air passing through the heater core 9 and cold air passing through the bypass path 10.

In the downstream end of the air-conditioner duct 2, a face outlet 12, which delivers conditioned air to the upper half of the passenger compartment, a foot outlet 13, which delivers conditioned air to the foot area of the passenger compartment, and a defroster outlet 14, which delivers conditioned air to the inner side of the windshield (not shown).

Upstream of the outlets 12–14, discharge-mode switching doors 15–17 are located to control the opening degree of the outlets 12–14 and to switch the discharge mode. The discharge-mode switching doors 15–17, the outlet switching door 5 and the air-mix door 11 are controlled to open and close by drivers, such as servo motors, and the drivers and the blower 6 are controlled by an electronic controller unit (ECU) 18.

Next, the refrigeration circuit 20 is described. The compressor 21 is powered by the engine 8 to take in refrigerant and compress it. The driving force for this compressor 21 is controlled by an electromagnetic clutch 21a, which can either transmit or interrupt the driving force as desired.

The condenser 22 is a high-pressure side heat exchanger, which cools and condenses high-temperature, high-pressure refrigerant from the compressor 21 through heat transfer to the atmospheric air. The receiver 23 is a gas and liquid separator that drains liquid refrigerant out by separating refrigerant that flows out of the condenser 22 into gas and liquid and reserving excess refrigerant for the refrigeration circuit 20.

The decompressor 24 is a decompressing means for decompressing the refrigerant that flows out of the receiver 23. In the present embodiment, the decompressor 24 employs a so-called temperature-sensing expansion valve, which controls the degree of opening of the refrigeration circuit, so that the degree of superheat becomes equal to a predetermined value at the refrigerant outlet of the evaporator 25.

Data inputted to an ECU 18 includes a chosen temperature Tset, which a passenger enters in a temperature setting means 18a when choosing the desired temperature of the passenger compartment. Air-conditioning sensor signals, such as a detected temperature Tin, which is the compartment temperature detected with a passenger compartment temperature sensor 18b, a detected temperature Tout, which is the outside air temperature detected with an outside air temperature sensor 18c, a detected pressure Pd, which is the pressure of the refrigerant discharged from the compressor 21 and which is detected with a discharge pressure sensor 18d, and the temperature Te of air that has just passed the evaporator 25, or the post-evaporation air temperature, which is detected with a temperature sensor 18e, are inputted to the ECU 18.

Next, characteristic operations specific to the present embodiment, namely, the refrigerant leak detection controls, are explained with reference to the flowchart shown in FIG. 2.

Figure 2:
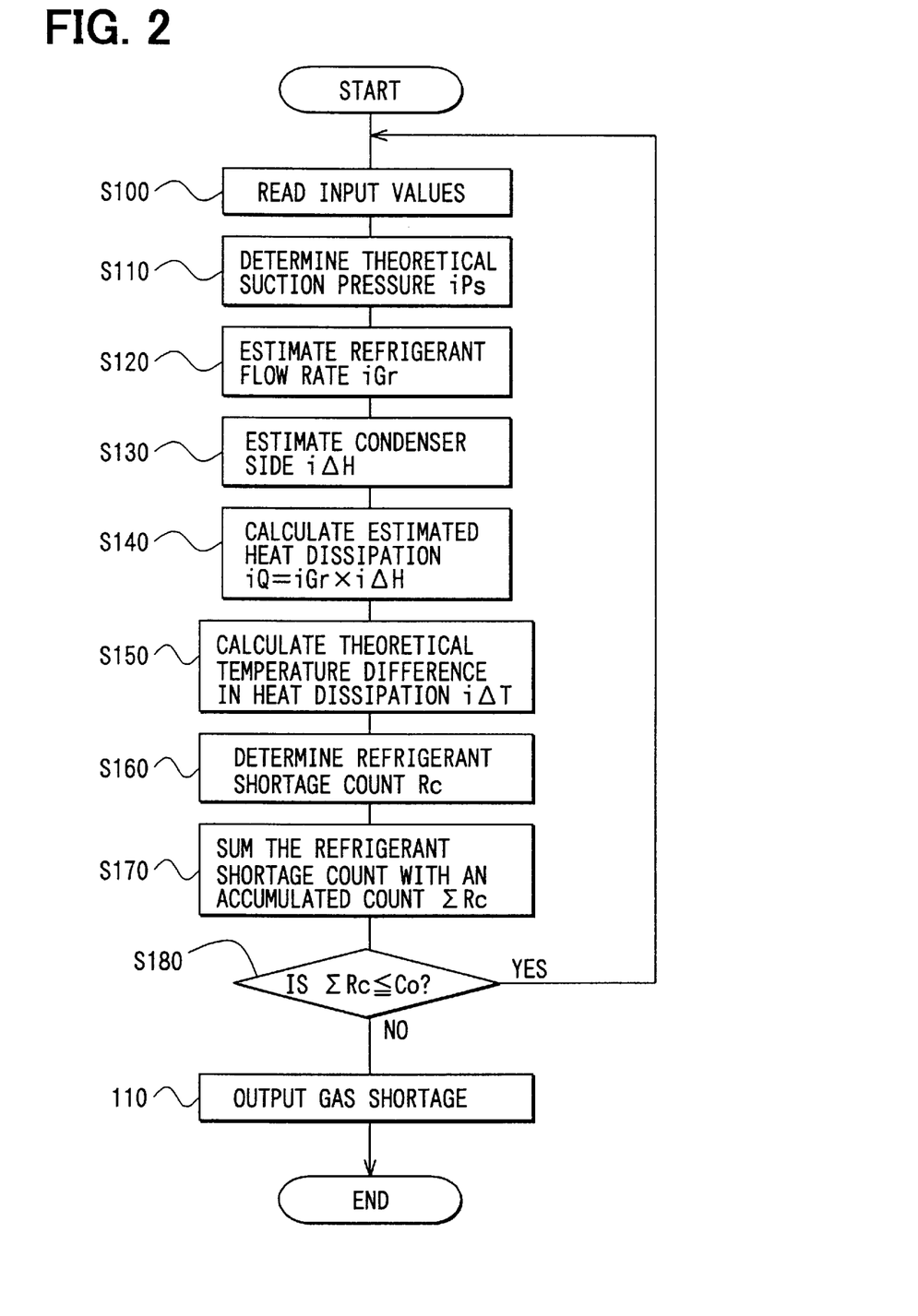
FIG. 2 is a flowchart illustrating the control process for the vehicle air-conditioning system according to the first embodiment.
Figure 3:
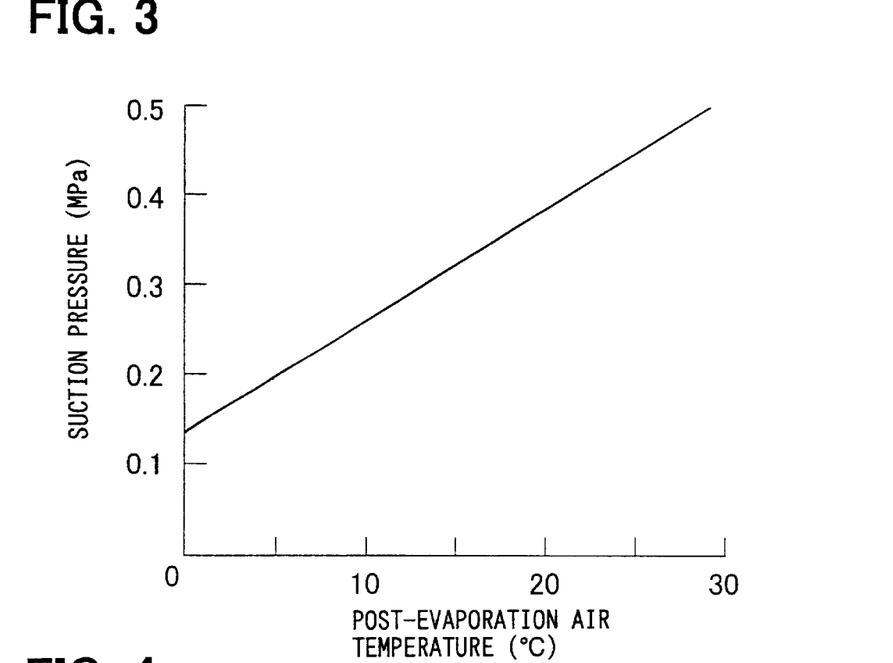
FIG. 3 is a graph illustrating the relationship between the post-evaporation temperature and suction pressure.

At the moment the electromagnetic clutch 21a is connected and the compressor 21, or the refrigeration circuit 20, is activated, the detected values sent to the ECU 18, such as the outside air temperature Tout, the discharge pressure Pd and the post-evaporation temperature Te, are read (S100), and then a theoretical, or estimated, suction pressure iPs of the compressor 21 is determined (S110) from the post-evaporation temperature Te based on the map of FIG. 3.

The map of FIG. 3 shows the relationship between the temperature of air that has just passed the evaporator 25 and the suction pressure of the compressor 21 when the normal level of refrigerant exists in the refrigeration circuit 20. This map is the product of an experiment where the thermal conditions were varied. In general, the temperature of air that has just passed through the evaporator 25 and the suction pressure of the compressor 21 have the relationship shown in FIG. 3 when the normal level of refrigerant exists in the refrigeration circuit 20.

In the next step, the density $\rho r$ of the refrigerant drawn into the compressor 21 is calculated from the map (not shown) based on the suction pressure iPs obtained at step S110, and then the weight flow rate iGr of refrigerant discharged from the compressor 21 is calculated (S120) by the following equation A.

$$iGr = Vc \times Nc \times \rho r \times \eta v \times 60 \times 10^{-6} \qquad \text{Equation A}$$

The symbol Vc represents the theoretical capacity of the compressor, or the theoretical volume flow discharged when the compressor rotates one cycle, Nc represents the rotations of the compressor (the engine rotations×the pulley ratio), and $\eta v$ represents the volume efficiency of the compressor (the compressor efficiency determined by the compressing ratio and rotations of the compressor).

Figure 4:
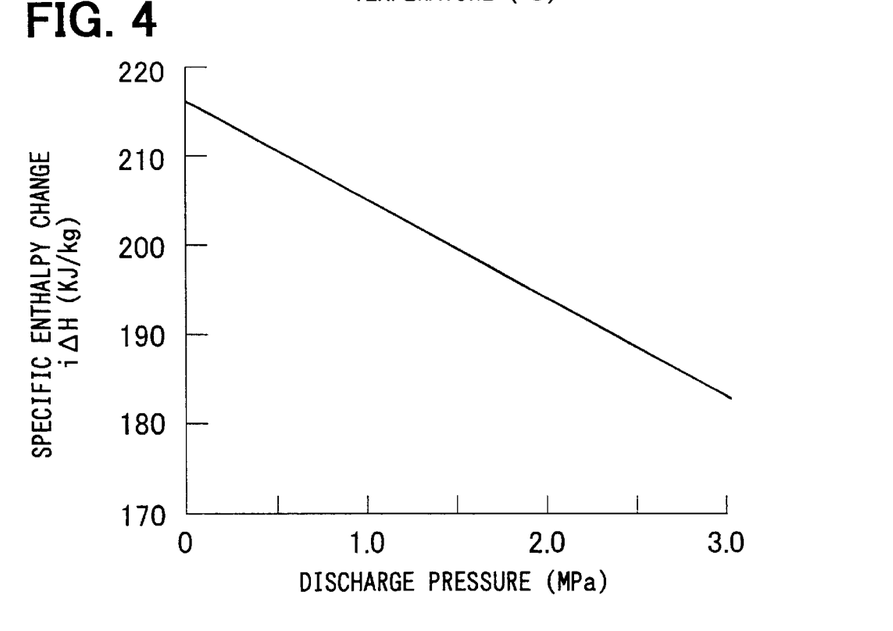
FIG. 4 is a graph illustrating the relationship between the specific enthalpy change in the condenser and the discharge pressure.

Subsequently, based on the map shown in FIG. 4, the theoretical specific enthalpy change in the condenser 22, namely the specific enthalpy change $i\Delta H$ of refrigerant on the discharge pressure side on the Mollier chart, is calculated (S130) from the discharge pressure Pd. Then the theoretical heat dissipation iQ ($iQ = i\Delta H \times iGr$) in the condenser 22 is calculated (S140) by multiplying this specific enthalpy change $i\Delta H$ and the refrigerant flow rate iGr calculated at step S120.

Next, based on the following equation B, the temperature difference (hereafter, referred to as the theoretical temperature difference in heat dissipation $i\Delta T$) between the theoretical temperature of the outside (atmospheric) air, that is, the temperature of the air that cools the condenser 22, and the condensation temperature of the refrigerant is calculated (S150). Then based on the map shown in FIG. 5, a refrigerant shortage count Rc is determined (S160) from the theoretical temperature difference in heat dissipation i$\Delta$T and the actual heat dissipation difference, that is, the difference $\Delta$T between the temperature of the outside air Tout and the condensation temperature of the refrigerant calculated from the discharge pressure Pd.

$$i\Delta T = iQ/(Wcon \times \Phi) \quad \text{Equation B}$$

The symbol Wcon represents the heat capacity of the cooling air passing through the condenser, and $\Phi$ represents the temperature efficiency. The value of Wcon$\times\Phi$ changes with the vehicle speed and is determined in this embodiment from a map (not shown) that has been determined experimentally in advance.

Figure 5:
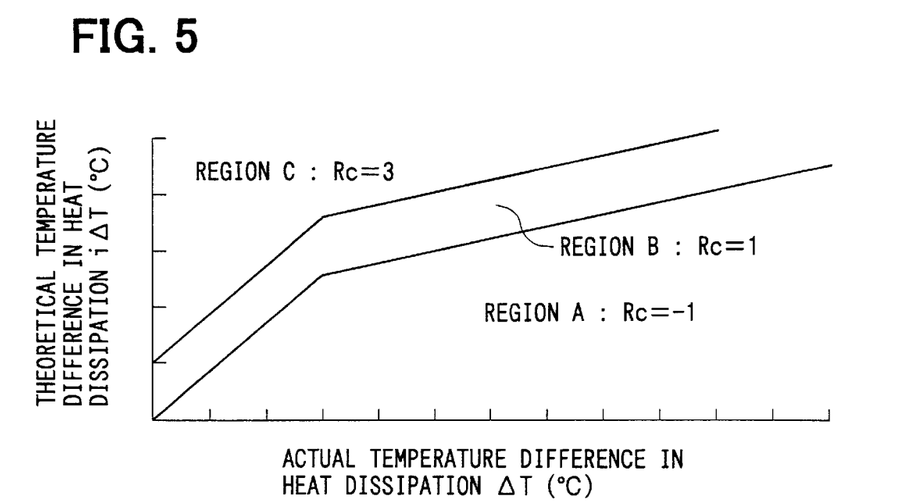
FIG. 5 is a graph illustrating the relationship between the theoretical temperature difference in heat dissipation and the actual temperature difference in heat dissipation.

If a point P, which is determined by the theoretical temperature difference in heat dissipation i$\Delta$T and the actual temperature difference in heat dissipation $\Delta$T, falls in region A in FIG. 5, the refrigerant shortage count Rc is set at $-1$, which represents a normal refrigerant level. If a point P falls in region B in FIG. 5, the refrigerant shortage count Rc is set at 1, which represents a slight shortage of refrigerant. If a point P falls in region C in FIG. 5, the refrigerant shortage count Rc is set at 3, which represents a shortage of refrigerant.

Then the currently calculated refrigerant shortage count Rc is summed (S170) with a previously accumulated refrigerant shortage count $\Sigma$Rc. Next, (S180) it is determined whether the newly accumulated refrigerant shortage count $\Sigma$Rc is smaller than a predetermined value Co (Co=64 in this embodiment).

In this step, if the accumulated count $\Sigma$Rc is equal to or smaller than the predetermined value Co, the amount of refrigerant is deemed to be equal to or larger than the predetermined level (about 50% of the normal amount) and steps S100–S180 are repeated. On the other hand, if the accumulated count $\Sigma$Rc is larger than the predetermined value Co, the amount of refrigerant is deemed to be lower than the predetermined level (about 50% of the normal amount). Then a warning notifying the driver that there is a shortage of refrigerant is issued by a voice message or a visual display (not shown) on the console in the passenger compartment.

Figure 6:
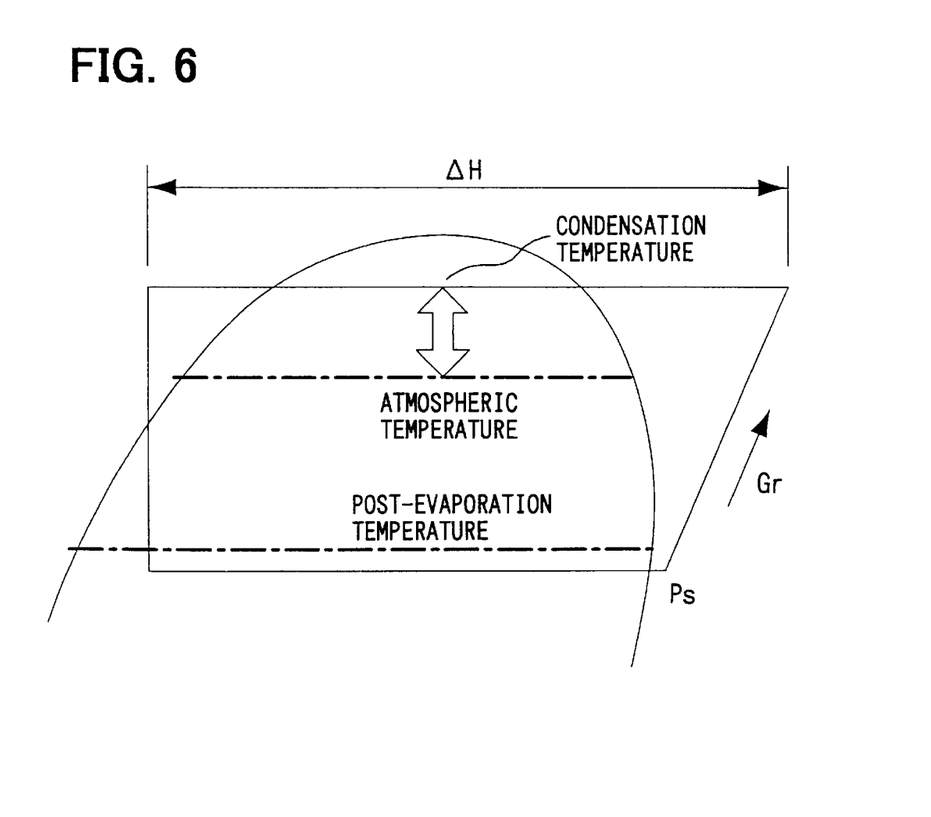
FIG. 6 is a Mollier chart for the case when the normal level of refrigerant exists in the refrigeration circuit.
Figure 7:
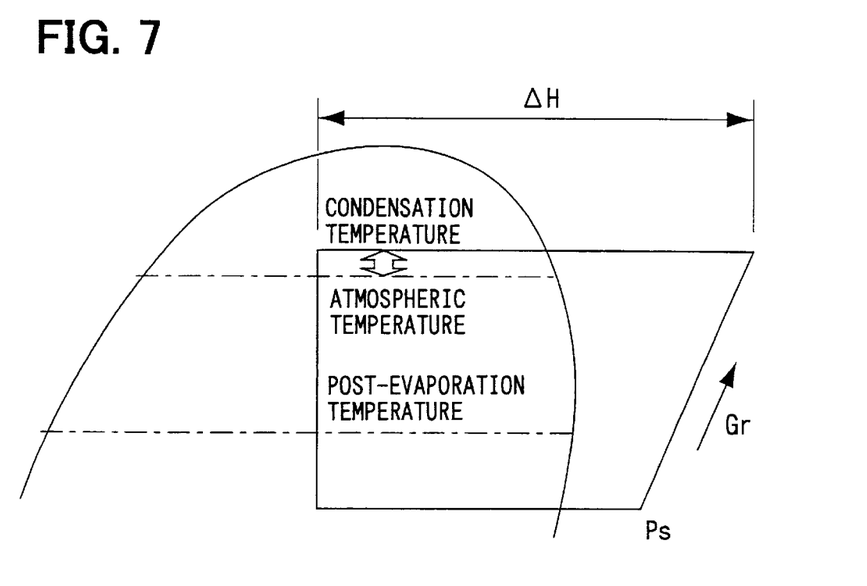
FIG. 7 is a Mollier chart demonstrating the behavior of the refrigeration cycle for the case when the refrigerant runs short.

FIG. 6 is the Mollier chart illustrating the case when the normal amount of refrigerant exists in the refrigeration circuit, and FIG. 7 is the Mollier chart representing the refrigeration cycle when there is a shortage of refrigerant.

Referring to FIG. 7, if there is a shortage of refrigerant, the pressure on the low pressure side, or the pressure in the evaporator 25, decreases because of the suction of the compressor 21, since just a small amount of refrigerant is supplied to the evaporator 25. At the same time, since all the liquid refrigerant evaporates in the evaporator 25, the refrigerating capability of the evaporator 25 falls, and as a result, the post-evaporation temperature Te becomes higher than the temperature in the evaporator.

On the other hand, if a normal amount of refrigerant exists in the refrigeration circuit, a sufficient amount of refrigerant is supplied to the evaporator 25 and all the liquid refrigerant does not evaporate in the evaporator 25. Thus, the temperature inside the evaporator 25 becomes approximately equal to the post-evaporation temperature Te, and as shown in FIG. 3, the post-evaporation temperature Te changes almost proportionally to the suction pressure.

Therefore, when there is a shortage of refrigerant, since the theoretical suction pressure iPs becomes higher than the actual suction pressure Ps, the theoretical density $\rho$r of drawn refrigerant becomes large, and the theoretical refrigerant flow rate iGr grows.

In addition, when there is a shortage of refrigerant, the refrigerating capability of the evaporator 25 falls, and the necessary amount of heat dissipation in the condenser 22 falls accordingly. Then as shown in FIG. 7, the temperature difference between the temperature of the outside air that cools the condenser 22 and the refrigerant condensation temperature becomes small. At the same time, since the actual specific enthalpy change .H in the condenser 22 becomes smaller than the specific enthalpy change .H that occurs when a normal amount of refrigerant exists in the refrigeration circuit, decompression starts during condensation.

Thus when there is a shortage of refrigerant, the theoretical specific enthalpy change i$\Delta$H becomes smaller than the actual specific enthalpy change $\Delta$H that occurs when the normal amount of refrigerant exists in the refrigeration circuit.

Summarizing the above phenomena: (1) If there is a shortage of refrigerant, the theoretical refrigerant flow rate iGr becomes larger than the actual refrigerant flow rate Gr; and (2) the theoretical specific enthalpy change i$\Delta$H becomes larger than the actual specific enthalpy change $\Delta$H. Therefore, when there is a shortage of refrigerant, the theoretical heat dissipation iQ (iQ=iGr$\times$i$\Delta$H) in the condenser 22 becomes larger than the actual heat dissipation Q (Q=Gr$\times\Delta$H) in the condenser 22.

In this case, the theoretical heat dissipation iQ in the condenser 22 is a product of the theoretical refrigerant flow rate iGr and the theoretical specific enthalpy change i$\Delta$H, and the actual heat dissipation Q in the condenser 22 is a product of the actual refrigerant flow rate Gr and the actual specific enthalpy change $\Delta$H. Thus, the difference between the theoretical heat dissipation iQ in the condenser 22 and the actual heat dissipation Q in the condenser 22 becomes great, compared with the difference between the theoretical refrigerant flow rate iGr and the actual refrigerant flow rate Gr or the difference between the theoretical specific enthalpy change i$\Delta$H and the actual specific enthalpy change $\Delta$H.

Therefore, it is possible to precisely detect a decrease in refrigerant by comparing the theoretical heat dissipation iQ in the condenser 22 and the actual heat dissipation Q in the condenser 22, even when the amount of refrigerant has only slightly decreased from the normal level. Thus refrigerant leaks can be detected at an early stage, and it is possible to prevent serious damage to the compressor 21.

On the other hand, the theoretical temperature difference in heat dissipation i$\Delta$T is almost proportional to the theoretical heat dissipation iQ in the condenser 22, and the actual temperature difference in heat dissipation $\Delta$T is almost proportional to the actual heat dissipation Q in the condenser 22. Thus the comparison between the theoretical temperature difference in heat dissipation i$\Delta$T and the actual temperature difference in heat dissipation $\Delta$T is almost equal to a comparison between the theoretical heat dissipation iQ in the condenser 22 and the actual heat dissipation Q in the condenser 22.

Although, as explained before, the theoretical heat dissipation iQ in the condenser 22 can be calculated from conventional sensor outputs, such as the post-evaporation temperature Te and the discharge pressure Pd, it is difficult to detect the actual heat dissipation Q in the condenser 22 directly from conventional sensor outputs.

As explained, the actual temperature difference in heat dissipation $\Delta$T, which is a parameter related to the actual heat dissipation Q in the condenser 22, can be calculated from the outside air temperature Tout, which is the temperature sensed by the outside air temperature sensor 18$c$, and the discharge pressure Pd, which is the pressure sensed by the discharge pressure sensor 18*d*. Therefore, if the theoretical temperature difference in heat dissipation i∆T and the actual temperature difference in heat dissipation ∆T are compared as described in this embodiment, it is possible to easily detect a refrigerant leak at early stages.

The specific heat of the cooling air sent to the condenser 22 is constant because the moisture in the cooling air does not condense. Thus the actual temperature difference in heat dissipation ∆T is almost proportional to the actual heat dissipation Q in the condenser 22. In contrast, since the air sent to the evaporator 25 is cooled in the evaporator 25 and then the moisture in the air condenses, the temperature difference between the temperature of air incoming to the evaporator 25 and that of air in the evaporator is not proportional to the heat absorbed in the evaporator 25.

Therefore, if a refrigerant leak is detected from the heat dissipation on the condenser 22 side, as is the case in this embodiment, it is not necessary to consider the water condensation. As a result, it is possible to calculate the heat dissipation on the condenser 22 side with high precision based only on the temperature difference in heat dissipation.

Depending on the running conditions of the vehicle, the thermal load and rotation of the compressor change and the refrigerant count Rc may be erroneously determined as falling in region C when, in fact, there is a refrigerant shortage. In this embodiment, however, erroneous determinations due to a temporal conditions is prevented because a shortage of refrigerant is determined when the accumulated count ΣRc, which is the sum of the previously accumulated refrigerant shortage count Rc and the presently calculated refrigerant shortage count Rc, is larger than the predetermined value Co.

Second Embodiment

In the second embodiment, a map (FIG. 8) that provides a refrigerant shortage count Rc based on the detection temperature of the temperature sensor 18*e*, or the post-evaporation temperature Te, and the actual temperature difference in heat dissipation ∆T is prepared in advance by field tests and numerical simulations. Thus, the calculation speed of the ECU 18 can be raised and the response of the air-conditioning system can be improved, since steps S110–S150 for the control of the air-conditioning system may be omitted.

Figure 8:
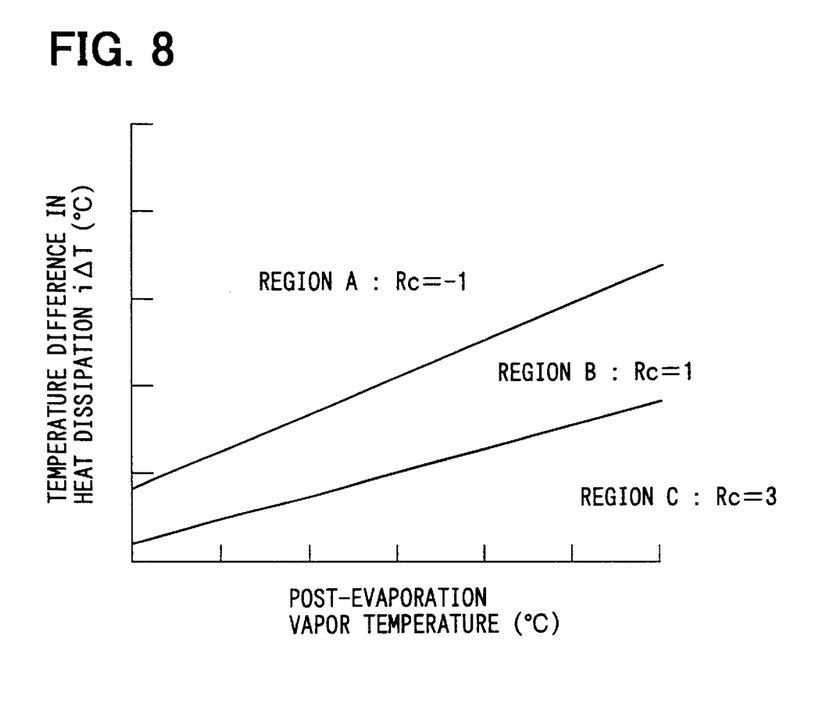
FIG. 8 is a graph illustrating the relationship between the temperature difference in heat dissipation and the post-evaporation temperature.

Since the theoretical heat dissipation iQ in the condenser 22 is, as explained before, calculated from the post-evaporation temperature Te, the lines dividing FIG. 8 into three regions A, B and C become parameters related to the theoretical heat dissipation iQ in the condenser 22, and the post-evaporation temperature Te and the actual temperature difference in heat dissipation ∆T become the parameters related to the actual heat dissipation Q in the condenser 22.

Third Embodiment

The apparatus of the first embodiment employed a compressor 21 having a fixed discharge capacity Vc. In this embodiment, however, a variable capacity (variable displacement) compressor 21 is employed.

The compressor 21 has a discharge throttle, and the refrigerant flow out of the compressor 21 is controlled to a predetermined value by controlling the discharge capacity of the compressor 21 so that the pressure difference across the throttle becomes equal to a predetermined value. This compressor is like that described in Japanese unexamined patent publication (JP-A) No. 2001-107854.

In this embodiment, the method for calculating the refrigerant weight flow rate iGr at step S120 in the flowchart (FIG. 2) used in the first embodiment is modified to account for the variable-capacity compressor 21.

Figure 9:
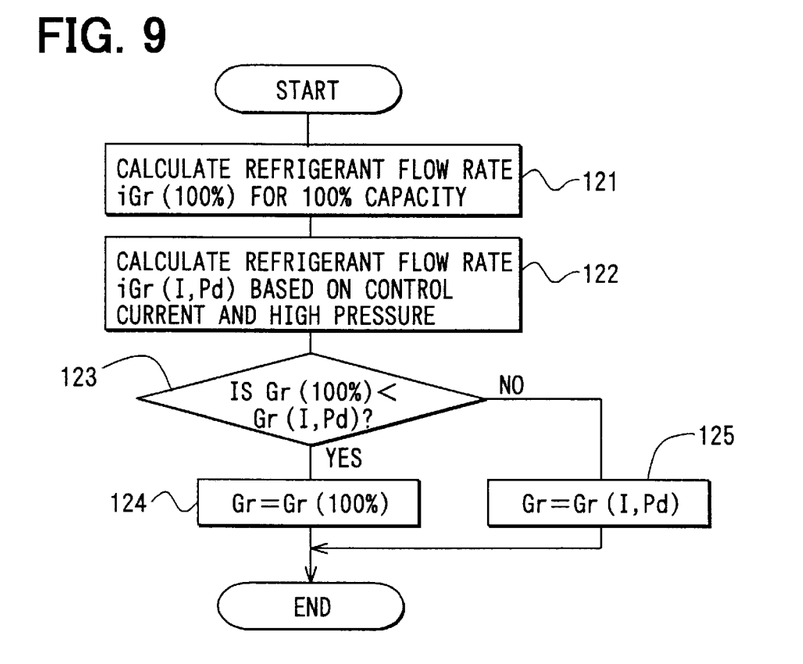
FIG. 9 is a flowchart illustrating the control process for the vehicle air-conditioning system according to a third embodiment of the invention.

FIG. 9 is a flowchart that includes calculation of the refrigerant weight flow rate iGr at step S120, where the refrigerant weight flow rate iGr that is produced when the compressor 21 is running at the maximum capacity (100% capacity) is calculated from the following equation C (step S121). The density ρr is calculated in the manner of the first embodiment.

$$iGr = Vc \times Nc \times \rho r \times \eta v \times 60 \times 10^{-6} \quad \text{Equation C}$$

The symbol Vc represents the theoretical capacity of the compressor when operated at 100% capacity, or the theoretical volume flow discharged when the compressor rotates one cycle, Nc represents the number of rotations of the compressor (engine rotations×pulley ratio), and ηv represents the volume efficiency of the compressor (compressor efficiency determined by the compressing ratio and the number of rotations of the compressor).

Figure 10:
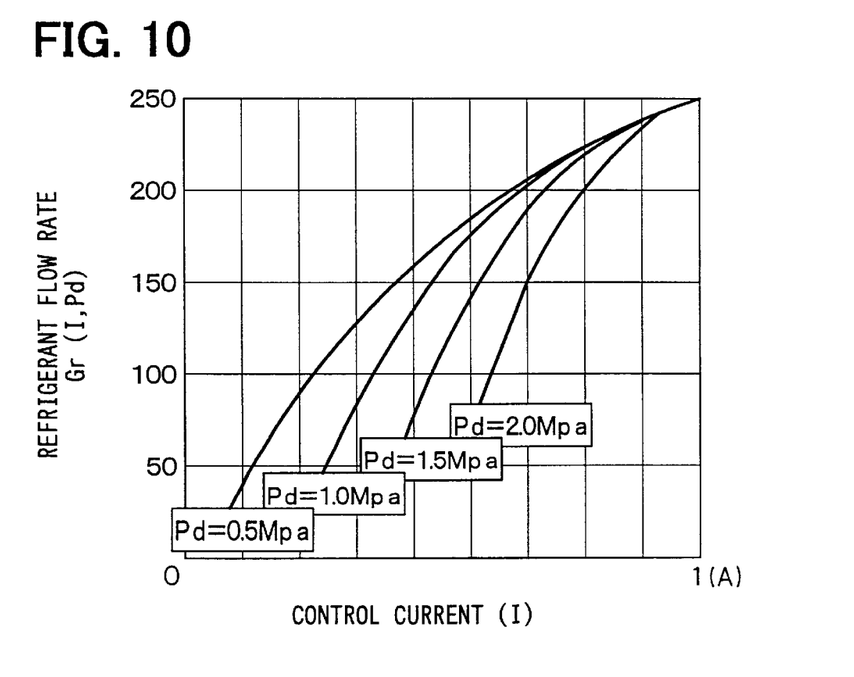
FIG. 10 is a graph illustrating the relationship between the control current and the refrigerant weight flow rate.

In the next step (S122), the refrigerant weight flow rate iGr is calculated from the control current I that determines the discharge capacity of the compressor 21, the discharge pressure Pd of the compressor 21, and the map of FIG. 10. In the flowchart of FIG. 9, the refrigerant weight flow rate iGr calculated in step S121 is indicated as iGr (100%), and the refrigerant weight flow rate iGr calculated in step S122 is indicated as iGr (I, Pd).

When the refrigerant weight flow rate iGr of step S121 and the refrigerant weight flow rate iGr obtained at step S122 are compared, the smaller one is used as the refrigerant weight flow rate iGr of step S120 (see FIG. 2).

Since the graph of FIG. 10 shows the maximum flow rate allowed in the design specifications determined by the control current I and the discharge pressure Pd, the actual flow rate does not exceed the flow rate provided at step S122. As a result, if the refrigerant weight flow rate iGr obtained at step S121 is smaller than that obtained at step S122, the theoretical refrigerant weight flow rate iGr becomes equal to the value obtained at step S121. However, on the other hand, if the refrigerant weight flow rate iGr obtained at S122 is smaller than that obtained at step S121, the theoretical refrigerant weight flow rate iGr becomes equal to the value obtained at step S122.

As a result, when using a variable-capacity type compressor 21, a decrease in refrigerant can be precisely detected even when the refrigerant has only slightly decreased from the normal level, as is the case with the first and second embodiments.

In this embodiment, the compressor 21 controls its discharge capacity so that the pressure difference across the throttle on the discharge side of the compressor 21 becomes equal to a predetermined value. However, this is exemplary, and the present invention can be applied to compressors of other types. For example, this invention can be applied to a compressor 21 that detects the refrigerant weight flow and changes its discharge capacity based on this detected flow rate.

Other Embodiments

In the first embodiment, the temperature difference in heat dissipation was used as a parameter related to the heat dissipation in the condenser 22 serving as a cooler. In another embodiment, the temperature difference across the condenser 22 of the cooling air (the temperature of outside air, Tout) sent to the condenser 22 may be used as a parameter related to the heat dissipation in the condenser 22.

Although the invention is used in a vehicle air-conditioning system in the above embodiments, the invention may be used in other vapor compression type refrigeration circuits.

In the first embodiment, the post-evaporation temperature Te was detected when calculating the refrigerant weight flow rate iGr. However, in addition to the post-evaporator temperature Te, if other parameters such as the flow rate, temperature, and humidity of air flowing in the evaporator 25 are taken into account, the refrigerant weight flow rate iGr can be calculated more precisely.

In the first embodiment, the discharge pressure Pd was detected when calculating the theoretical specific enthalpy change iΔH. However, in addition to the discharge pressure Pd, if other parameters such as the amount of air sent to the condenser 22 (for example, the number of rotations of the blower and the vehicle speed) and temperature rise of the cooling air due to the mixing of heated air sent from the engine room during idling (when the vehicle is at a standstill) are taken into account, the specific enthalpy change iΔH can be calculated more precisely.

In the above embodiment, the heat dissipation in the evaporator 22 was noted. However, the amount of refrigerant remaining in the circuit may be determined by comparing a parameter related to the actual heat absorption in the evaporator 25 and a theoretical parameter related to the heat absorption in the evaporator 25.

What is claimed is:

1. A vapor compression type refrigeration apparatus having a refrigeration circuit, the apparatus comprising:
   a compressor;
   a condenser, wherein the condenser cools high-temperature, high-pressure refrigerant compressed with the compressor;
   a decompressor;
   an evaporator for evaporating low-temperature, low-pressure refrigerant decompressed with the decompressor; and
   means for determining the amount of refrigerant remaining in the refrigeration circuit by comparing an actual parameter related to actual heat dissipation in the condenser and a theoretical parameter related to heat dissipation in the condenser.

2. The apparatus of claim 1, wherein the means for determining the amount of refrigerant remaining in the refrigeration circuit comprises:
   actual heat dissipation parameter calculation means for calculating an actual parameter related to actual heat dissipation;
   theoretical heat dissipation parameter calculation means for calculating a theoretical parameter related to heat dissipation in the condenser based on data provided when a normal level of refrigerant exists in the refrigeration circuit; and
   remaining refrigerant amount determination means for determining the amount of refrigerant remaining in the refrigeration circuit by comparing the parameter calculated by the actual heat dissipation parameter calculation means and the parameter calculated by the theoretical heat dissipation parameter calculation means.

3. The vapor compression type refrigeration apparatus according to claim 2, wherein the actual parameter and the theoretical parameter each represent a temperature difference between a temperature related to the temperature of refrigerant in the condenser and the temperature of cooling air sent to the condenser.

4. The vapor compression type refrigeration apparatus according to claim 2, wherein the actual parameter and theoretical parameter each represent a temperature difference in cooling air across the condenser.

5. The vapor compression type refrigeration apparatus according to claim 2, wherein the theoretical parameter is calculated based on the suction pressure of the compressor.

6. The vapor compression type refrigeration apparatus according to claim 2, wherein the theoretical parameter is calculated based on a specific enthalpy change of refrigerant in the condenser.

7. The vapor compression type refrigeration apparatus according to claim 2, wherein the theoretical parameter is calculated based on the suction pressure of the compressor, and the theoretical parameter is calculated based on a specific enthalpy change of refrigerant in the condenser.

8. The vapor compression type refrigeration apparatus according to claim 1, wherein the theoretical parameter is calculated based on the suction pressure of the compressor.

9. The vapor compression type refrigeration apparatus according to claim 1, wherein the theoretical parameter is calculated based on a specific enthalpy change of refrigerant in the condenser.

10. The vapor compression type refrigeration apparatus according to claim 1, wherein the theoretical parameter is calculated based on the suction pressure of the compressor, and the theoretical parameter is calculated based on a specific enthalpy change of refrigerant in the condenser.

11. The vapor compression type refrigeration apparatus according to claim 1, wherein the compressor is a variable-capacity type compressor that can vary its discharge capacity so that its discharge rate is directed to a predetermined value.

12. The vapor compression type refrigeration apparatus according to claim 11, wherein the theoretical parameter is calculated based on the smaller of a refrigerant flow rate calculated based on 100% compressor capacity and a maximum flow rate determined at least based on the discharge pressure of the compressor.

13. The vapor compression type refrigeration apparatus according to claim 1, wherein the compressor is a variable-capacity type compressor that can vary its discharge capacity based on the pressure difference across a throttle installed in the refrigerant circuit.

14. The apparatus of claim 1, wherein the means for determining the amount of refrigerant remaining in the refrigeration circuit comprises:
   actual heat dissipation parameter calculation means for calculating an actual parameter related to actual heat dissipation;
   theoretical heat dissipation parameter calculation means for calculating a theoretical parameter related to heat dissipation in the condenser based on a physical quantity related to an evaporation temperature of refrigerant in the evaporator when a normal level of refrigerant exists in the refrigeration circuit; and
   remaining refrigerant amount determination means for determining the amount of refrigerant remaining in the refrigeration circuit by comparing the parameter calculated by the actual heat dissipation parameter calculation means and the parameter calculated by the theoretical heat dissipation parameter calculation means.

15. The vapor compression type refrigeration apparatus according to claim 14, wherein the actual parameter and the theoretical parameter each represent a temperature difference between a temperature related to the temperature of refrigerant in the condenser and the temperature of cooling air sent to the condenser.

16. The vapor compression type refrigeration apparatus according to claim 14, wherein the actual parameter and theoretical parameter each represent a temperature difference in cooling air across the condenser.

17. The vapor compression type refrigeration apparatus according to claim 14, wherein the theoretical parameter is calculated based on the suction pressure of the compressor.

18. The vapor compression type refrigeration apparatus according to claim 14, wherein the theoretical parameter is calculated based on a specific enthalpy change of refrigerant in the condenser.

19. The vapor compression type refrigeration apparatus according to claim 14, wherein the theoretical parameter is calculated based on the suction pressure of the compressor, and the theoretical parameter is calculated based on a specific enthalpy change of refrigerant in the condenser.

20. A vapor compression type refrigeration apparatus having a refrigeration circuit, the apparatus comprising:

a compressor;

a condenser, wherein the condenser cools high-temperature, high-pressure refrigerant compressed with the compressor;

a decompressor;

an evaporator for evaporating low-temperature, low-pressure refrigerant decompressed with the decompressor; and means for determining an amount of refrigerant remaining in the refrigeration circuit by comparing an actual parameter related to actual heat absorption in the evaporator and a theoretical parameter related to heat absorption in the evaporator.

21. A method of detecting a shortage of refrigerant in a refrigeration circuit comprising determining the amount of refrigerant remaining in the refrigeration circuit by comparing an actual parameter related to actual heat dissipation in a condenser and a theoretical parameter related to heat dissipation in the condenser.

22. The method according to claim 21 including:

calculating an actual parameter related to actual heat dissipation;

calculating a theoretical parameter related to heat dissipation in the condenser; and determining the amount of refrigerant remaining in the refrigeration circuit by comparing the actual heat dissipation parameter and the theoretical heat dissipation parameter.

23. The method according to claim 22, wherein the theoretical parameter is based on data provided when a normal level of refrigerant exists in the refrigeration circuit.

24. The method according to claim 22, wherein the theoretical parameter is based on a physical quantity related to an evaporation temperature of refrigerant in an evaporator when a normal level of refrigerant exists in the refrigeration circuit.

* * * * *